(12) United States Patent
Villani et al.

(10) Patent No.: US 9,303,105 B2
(45) Date of Patent: Apr. 5, 2016

(54) PROCESS FOR THE PREPARATION OF SEVELAMER

(71) Applicant: LABORATORIO CHIMICO INTERNAZIONALE S.P.A., Milan (IT)

(72) Inventors: Flavio Villani, Milan (IT); Bruno De Angelis, Segrate (IT); Antonio Nardi, Segrate (IT); Maria Paternoster, Udine (IT)

(73) Assignee: LABORATORIO CHIMICO INTERNAZIONALE S.P.A., Milan (IT)

( * ) Notice: Subject to any disclaimer, the term of this patent is extended or adjusted under 35 U.S.C. 154(b) by 82 days.

(21) Appl. No.: 14/173,898

(22) Filed: Feb. 6, 2014

(65) Prior Publication Data

US 2014/0213736 A1   Jul. 31, 2014

Related U.S. Application Data

(63) Continuation of application No. 13/319,821, filed as application No. PCT/IB2010/001071 on May 10, 2010, now abandoned.

(30) Foreign Application Priority Data

May 12, 2009   (IT) .............................. MI2009A0816

(51) Int. Cl.
*C08F 26/02* (2006.01)
*C08J 3/24* (2006.01)
*C08F 8/00* (2006.01)

(52) U.S. Cl.
CPC . *C08F 26/02* (2013.01); *C08F 8/00* (2013.01); *C08J 3/24* (2013.01); *C08J 2339/00* (2013.01)

(58) Field of Classification Search
CPC ............ C08F 126/02; C08F 8/18; C08F 8/44; C08F 26/02; C08J 2339/00; C08J 3/24
USPC ................................................ 525/293, 328.4
See application file for complete search history.

(56) References Cited

U.S. PATENT DOCUMENTS

| | | | |
|---|---|---|---|
| 6,180,754 B1 * | 1/2001 | Stutts et al. | 528/422 |
| 7,220,406 B2 | 5/2007 | Burke | |
| 2003/0078366 A1 | 4/2003 | McDonnell et al. | |
| 2005/0131138 A1 * | 6/2005 | Connor et al. | 524/612 |

FOREIGN PATENT DOCUMENTS

| | | | |
|---|---|---|---|
| EP | 0223222 | | 5/1987 |
| WO | WO 98/57652 | | 12/1998 |
| WO | WO 00/63259 | | 10/2000 |
| WO | WO 01/18072 | | 3/2001 |
| WO | WO2008/005217 | * | 1/2008 |
| WO | WO 2008/062437 | | 5/2008 |

OTHER PUBLICATIONS

International Search report for PCT/IB2010/001071 mailed Aug. 6, 2010.
Written Opinion of the International Searching Authority mailed Aug. 6, 2010.

* cited by examiner

*Primary Examiner* — Liam J Heincer
*Assistant Examiner* — Nicholas Hill
(74) *Attorney, Agent, or Firm* — Nixon & Vanderhye P.C.

(57) ABSTRACT

The present invention relates to a process for the preparation of sevelamer, in particular sevelamer hydrochloride and sevelamer carbonate/bicarbonate, by means of a process that allows sevelamer to be obtained with good yields and using conventional reactors, without requiring to use specific and expensive equipment.

10 Claims, No Drawings

PROCESS FOR THE PREPARATION OF SEVELAMER

CROSS REFERENCE

This application is a continuation of U.S. patent application Ser. No. 13/319,821, filed Dec. 28, 2011, pending, which is the U.S. national phase of International Application No. PCT/IB2010/001071, filed May 10, 2010 which designated the U.S. and claims priority to MI2009A000816, filed May 12, 2009, the entire contents of each of which are hereby incorporated by reference in this application.

TECHNICAL BACKGROUND

Sevelamer, or poly(allylamine-co-N,N'-diallyl-1,3-diamino-2-hydroxypropane), is a polymer compound having the formula

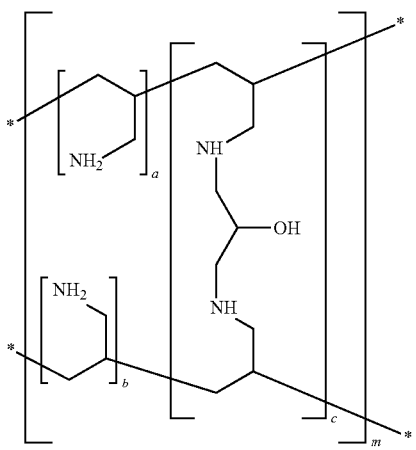

wherein a+b=9; c=1; and m is variable,

Sevelamer is marketed as the hydrochloride salt under the trade name Renagel® for controlling hyperphosphatemia (increase in the level of phosphates in the blood) in adult patients undergoing dialysis or hemodialysis. Recently, the sevelamer carbonate/bicarbonate salt, under the trade name Renvela®, has also been placed on the market.

Different types of the synthesis of sevelamer are known, all substantially deriving from cross-linking with high molecular weight polyallylamine epichlorohydrin.

Polyallylamine is a polymer compound known in the art with the CAS RN 71550-12-4 and is obtained by allylamine polymerization.

One of the major problems encountered during the synthesis of sevelamer is the production of a highly congealed and viscous reaction mass, which must be adequately stirred and crumbled in order to obtain a final product in solid form.

Some patent documents describe the synthesis of sevelamer by reaction between an aqueous solution of polyallylamine and epichlorohydrin in an organic solvent, such as toluene or acetonitrile. The use of the organic solvent is necessary in order to process the congealed and difficult to process mass, as seen above.

U.S. Pat. No. 6,180,754 in the name of The Dow Chemical Company, describes a process for the synthesis of sevelamer that provides for the use of a LIST reactor to perform the cross-linking step. This reactor, produced by the company LIST Inc., is a reactor specifically designed for processing high viscosity materials. It is easily understood that this reactor is not commonly used and that its use requires specific and economically important investments, unjustified for the preparation of a single active ingredient.

The patent application WO01/18072 describes a process for the preparation of sevelamer hydrochloride comprising partial desalification of a solution of polyallylamine hydrochloride, removal of salts through ion exchange or electrodeionization and by means of subsequent optional nanofiltration or ultrafiltration of the partially desalified polyallylamine, and then causing it to react with epichlorohydrin. As stated in the text of WO01/18072 (for example pages 4 and 5), during desalification of the polyallylamine hydrochloride with metal hydroxides a substantial quantity of salts is produced. The steps of removing salts and of nanofiltration or ultrafiltration are therefore necessary, as otherwise a very viscous and non-stirrable mixture is obtained during the subsequent cross-linking reaction with epichlorohydrin. This mass would require the use of a LIST reactor as seen above or, alternatively, the addition of substantial quantities of organic solvents.

It is evident that these further reaction steps are laborious and entail substantial costs at industrial level.

DESCRIPTION OF THE INVENTION

The aim of the present invention is to provide a process for the preparation of sevelamer which overcomes the drawbacks of the prior art.

It has now been found that it is possible to avoid the use of reactors to process high viscosity materials and also the use of organic solvents, starting from polyallylamine aqueous solutions, at specific concentrations.

In particular, it has been noted that a particular concentration interval of the polyallylamine aqueous solution which must be subjected to cross-linking, leads to a reaction mass easily workable and processable even in conventional reactors, commonly present in chemical production plants and does not require the addition of organic solvents.

Therefore, according to one of its aspects, the invention relates to a process for the preparation of sevelamer which comprises partially salifying, preferably with hydrochloric acid, a polyallylamine aqueous solution having a concentration between 10% and 14.5% (w/w) and reacting it with epichlorohydrin, in the absence of any organic solvents.

In particular, the invention relates to a process comprising the steps of:
 (a) partially salifying a polyallylamine aqueous solution having a concentration between 10% and 14.5% (w/w), preferably to a degree of salification of 25-40%;
 (b) adding epichlorohydrin, preferably in an "allylamine unit"/"epichlorohydrin" molar ratio of around 8-11/1;
 (c) maintaining the reaction mixture under stirring, preferably at 65 to 85° C. for a few hours;
 (d) isolating the sevelamer thus obtained.

According to a preferred aspect of the invention, the polyallylamine is partially salified with hydrochloric acid and the sevelamer obtained in step (d) is sevelamer hydrochloride.

The initial polyallylamine aqueous solution is commercially available. This polyallylamine can be suitably diluted with water to the desired concentration.

According to a preferred embodiment, the concentration of the polyallylamine aqueous solution is between 11% and 14.5%, preferably between 12.5 and 14.5%, advantageously this concentration is around 13-14%.

Concentrations below 10% could in theory be used, but the copious quantity of water would lead to a more laborious process to isolate the sevelamer from the reaction mixture.

The epichlorohydrin used according to the present invention is also commercially available.

In practice, for the preparation of sevelamer according to the invention, the polyallylamine aqueous solution is loaded into a common reactor, hydrochloric acid is added to reach the degree of salification required and epichlorohydrin is dosed, preferably controlling the temperature as the reaction is exothermic.

According to a preferred embodiment, the temperature of the reaction mixture is maintained around 20-25° C. during the step of acid addition.

The quantity of acid to add to the polyallylamine depends on the degree of salification required. According to an advantageous embodiment, the polyallylamine is salified to 25-40%, for example around 30-35%. Therefore, by way of example, salification can be achieved using a "allylamine unit"/"hydrochloric acid" molar ratio of around 3-3.5/1. The hydrochloric acid is preferably added in an aqueous solution.

Epichlorohydrin is then added to the partially salified polyallylamine solution.

The "allylamine unit"/"epichlorohydrin" ratio is advantageously around 8-11/1, preferably around 9/1.

After epichlorohydrin has been added, the mixture is maintained under stirring for some time, for example a few hours, and the reaction mixture is then heated to a temperature between 65 and 85° C., preferably between 75 and 83° C.

The cross-linking reaction is normally complete in a few hours.

Therefore, with the process of the invention, which involves the use of specific concentrations of initial polyallylamine, it is possible to obtain a final reaction mixture that is easy to work and filter. On the contrary, as will be shown by the comparative tests in the experimental section of the present description, greater concentrations lead to an extremely dense and congealed reaction mixture, which can only be processed in special equipment, such as the LIST reactor, or by adding organic solvents.

Moreover, it will also be understood that, contrary to the process described in WO01/18072 in which salt is removed from the polyallylamine hydrochloride with metal hydroxides, in the process of the invention that starts from a polyallylamine which is salified by adding an acid, no salts are produced and therefore no further and laborious reaction steps are required, such as removal of salts and nanofiltration or ultrafiltration. This aspect of the invention, together with the specific percentages of polyallylamine used in the initial aqueous solution, provides a the synthesis of sevelamer that is industrially simple and inexpensive.

The sevelamer obtained according to the process of the invention can be directly filtered and dried according to methods known in the art.

Alternatively, at the end of the reaction with epichlorohydrin, a water miscible solvent, advantageously isopropanol, can be added to the reaction mass and maintained under stirring for some time, and the sevelamer thus obtained can then be filtered and dried. This last experimental solution is not necessary but can be used to facilitate obtaining a sevelamer that is easier to filter, or which can even be separated by decantation of the liquid part of the mixture.

According to a further embodiment of the invention, the sevelamer obtained with the process described above can be converted into sevelamer carbonate/bicarbonate according to known techniques, for example by reaction with gaseous carbon dioxide or other carbonating agents, such as carbonates of alkaline or alkaline-earth metals. If carbon dioxide is used, the reaction can be conducted in a basic aqueous solvent, such as in a sodium hydroxide solution or also in solid phase, i.e. without using solvents. Details of the process of the invention are provided in the experimental section of the description.

As will be apparent to those skilled in the art, by suitably varying the reaction conditions it is possible to obtain a mixture of sevelamer hydrochloride and sevelamer carbonate/bicarbonate. said mixture, obtained with the process described here, represents a further aspect of the present invention.

The sevelamer hydrochloride obtained with the process of the invention, having the properties indicated below, and more specifically in the experimental section hereunder, forms a further object of the invention:

| | |
|---|---|
| Chlorides % (weight/weight) | 17-19 |
| Swell index | 12-13 |
| Phosphate binding capacity (mmol/g) | 5.5-6.4 |
| Epichlorohydrin | not detectable (<5 ppm) |

Experimental Section

Example 1

Sevelamer Preparation

Loads

| PAA Solution 14.0% (g) | PAA 100% (g) | PAA (mol allylamine units) | epichlorohydrin (mol) | epichlorohydrin (g) | HCl (mol) | HCl 38.2% (g) | washing isopropanol (g) |
|---|---|---|---|---|---|---|---|
| 16650 | 2344 | 41.1 | 4.6 | 426.5 | 11.9 | 1137 | 14630 |

A conventional reactor, with blade stirrer, is used. HCl is added to the polyallylamine loaded into the reactor in two batches dosed at a distance of 15 minutes. When the temperature reaches around 25° C., dosing of epichlorohydrin begins and continues for around 10 minutes. After 45 minutes, heating to 78° C.-83° C. begins and continues for 3 hours, at the end of which the product, after cooling to room temperature, is washed with isopropanol. Washing is performed by maintaining the product under stirring with isopropanol for 1 hour, then the product is centrifuged and vacuum dried at 60° C. for 3 hours, finally obtaining 2.94 kg of product in the form of a whitish solid.

Example 2

Sevelamer Preparation

The same procedure as described in example 1 is followed, but isopropanol is not added and the reaction mixture is instead maintained at 20-25° C. for three hours. The final product is isolated by filtration.

Properties of the Sevelamer Obtained

| Swell index | 12.5 |
| --- | --- |
| Phosphate binding capacity (mmol/g) | 5.8 |
| Chloride content (weight/weight) | 18.5% |
| Epichlorohydrin | not detectable (<5 ppm) |

The analytical evaluations are performed according to methods known in the art and conventionally used for sevelamer.

Comparative Example

Sevelamer Preparation Starting from a 30% Solution of Polyallylamine

Loads:

| PAA Solution 30% (g) | PAA 100% (g) | PAA (mol allylamine units) | epichlorohydrin (mol) | epichlorohydrin (g) | HCl (mol) | HCl 38.2% (g) |
| --- | --- | --- | --- | --- | --- | --- |
| 483.5 | 145 | 2.54 | 0.28 | 26 | 0.79 | 77.5 |

The process of example 1 is repeated. After adding one part of epichlorohydrin a vitreous and intractable gel is obtained, which blocked stirring.

Example 3

Sevelamer Carbonate/Bicarbonate Preparation 1.4 kg of water is loaded into a 2 liter glass reactor. The temperature is set to 35° C. and 100 g of sevelamer hydrochloride is added in portions, stirring the mixture. A solution of 30% sodium hydroxide is then added until pH 12 is reached (around 71 g) and gaseous carbon dioxide is bubbled through. The temperature is maintained at 35-37° C. until pH 7.2 is reached. The mixture is maintained at 35° C. under stirring for 2 hours and if necessary further carbon dioxide is bubbled through until the pH is stabilized at 7.2. The suspension is filtered, the solid washed repeatedly with water to eliminate as much of the residual chlorine as possible. The solid thus obtained is dried and ground.

Example 4

Sevelamer Carbonate/Bicarbonate Preparation in Solid Phase 1.4 kg of water is loaded into a 2 liter glass reactor. The temperature is set to 35° C. and 100 g of sevelamer hydrochloride is added in portions, stirring the mixture. A solution of 30% sodium hydroxide is then added until pH 12 is reached (around 71 g). The suspension is maintained at 35-37° C. under stirring for 40 minutes and then filtered, the wet solid is resuspended in 800 ml of distilled water and stirred for two hours at room temperature. The solid is then filtered and washed with distilled water. The solid is loaded into a fluid bed dryer at 50° C. for three hours, after which a carbon dioxide stream is passed through the solid until obtaining an internal pressure of around 40000 Pa. The flow is maintained until the pressure decreases. Finally, the drier is maintained under vacuum and the temperature is raised to 60° C. for 72 hours. Sevelamer carbonate/bicarbonate is thus obtained.

The invention claimed is:

1. A process for the preparation of sevelamer characterized by the absence of the formation of an intractable gel comprising the following steps:
   (a) partially salifying a polyallylamine aqueous solution reaction mixture having a concentration between 10% and 14.5% (w/w) up to a degree of salification of 25-40%, wherein said reaction mixture is free from salt without further purification;
   (b) adding epichlorohydrin;
   (c) maintaining the reaction mixture under stirring;
   (d) isolating the sevelamer thus obtained;
characterized in that the reaction mixture in steps (a) to (c) are maintaining under stirring and carried out in the absence of any organic solvents,
and
wherein the polyallylamine is salified by an acid.

2. The process according to claim 1, wherein the addition of epichlorohydrin in step (b) is in an allylamine unit to epichlorohydrin molar ratio of around 8-11 to 1.

3. The process according to claim 1, characterized in that in the step (c) it is maintained under stirring at 65 and 85° C. for a few hours.

4. The process according to claim 1, characterized in that said polyallylamine aqueous solution has a concentration between 12.5 and 14.5%.

5. The process according to claim 4, characterized in that said polyallylamine aqueous solution has a concentration between 13 and 14%.

6. The process according to claim 1, characterized in that polyallylamine is partially salified with hydrochloric acid.

7. The process according to claim 1, characterized in that the sevelamer thus obtained is converted into sevelamer carbonate/bicarbonate.

8. The process according to claim 7, characterized in that the sevelamer thus obtained is converted into sevelamer carbonate/bicarbonate by reaction with gaseous $CO_2$.

9. The process according to claim 7, characterized in that the conversion into sevelamer carbonate/bicarbonate with gaseous $CO_2$ is carried out in solid phase.

10. A process for the preparation of sevelamer characterized by the absence of the formation of an intractable gel comprising the following steps:
   (a) partially salifying a polyallylamine aqueous solution reaction mixture having a concentration between 10% and 14.5% (w/w) up to a degree of salification of 25-40%, wherein said reaction mixture is free from salt absent further purification from nanofiltration or ultrafiltration;
   (b) adding epichlorohydrin;
   (c) maintaining the reaction mixture under stirring;
   (d) isolating the sevelamer thus obtained;
characterized in that the reaction mixture in steps (a) to (c) are maintaining under stirring and carried out in the absence of any organic solvents,
and wherein the polyallylamine is salified by an acid.

\* \* \* \* \*